United States Patent
Tamaru et al.

[11] Patent Number: 6,156,681
[45] Date of Patent: Dec. 5, 2000

[54] MULTI LAYERED FELT, MEMBER FORMED OF SAME, AND METHOD OF MANUFACTURING SAME

[75] Inventors: Shinji Tamaru; Katsutoshi Yamamoto; Jun Asano, all of Settsu, Japan

[73] Assignee: Daikin Industries, Ltd., Osaka, Japan

[21] Appl. No.: 09/101,729

[22] PCT Filed: Jan. 13, 1997

[86] PCT No.: PCT/JP97/00055

§ 371 Date: Jul. 16, 1998

§ 102(e) Date: Jul. 16, 1998

[87] PCT Pub. No.: WO97/26135

PCT Pub. Date: Jul. 24, 1997

[30] Foreign Application Priority Data

Jan. 16, 1996 [JP] Japan ................................. 8-005247

[51] Int. Cl.[7] ...................................................... B32B 5/16
[52] U.S. Cl. ........................ 442/383; 442/381; 442/383; 442/384; 442/397; 442/401; 442/403; 442/405; 442/408; 427/508; 428/369; 428/399; 156/148; 28/107
[58] Field of Search .................................. 427/508, 554, 427/558, 581, 595, 591; 428/369–399; 442/381, 383, 384, 397, 401, 403, 405, 408; 156/148; 28/107

[56] References Cited

U.S. PATENT DOCUMENTS 4,324,574   4/1982   Fagan ........................................ 55/487

FOREIGN PATENT DOCUMENTS

| 57-126655 | 8/1982 | Japan . |
| 58-35468 | 8/1983 | Japan . |
| 61-50296 | 11/1986 | Japan . |
| 3-68409 | 3/1991 | Japan . |

*Primary Examiner*—Richard Weisberger
*Attorney, Agent, or Firm*—Sughrue, Mion, Zinn, Macpeak & Seas, PLLC

[57] ABSTRACT

To provide various members such as filter cloth for dust collection which assures small pressure loss and easy shaking down of dust particles and is excellent in friction property and mechanical strength, sliding member excellent in sliding property, water repellent member excellent in water repellency, non-sticking member excellent in non-sticking property and member for supplying mold releasing agent in electrophotographic apparatuses which is excellent in air permeability, heat resistance and oil resistance, and provide a multilayered felt used therefor and a process for producing the multilayered felt. The multilayered felt is obtained by placing a layer of a web comprising polytetrafluoroethylene staple fibers on at least one surface of a felt and then joining the polytetrafluoroethylene staple fibers and fibers which form the felt by intermingling through water jet needling and/or needle punching.

12 Claims, 11 Drawing Sheets

FIG. 1(a) BEFORE DUST COLLECTION
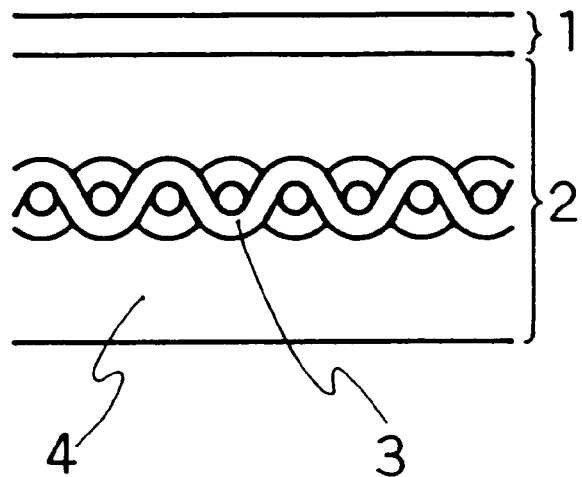
FIG. 1(b) AFTER DUST COLLECTION
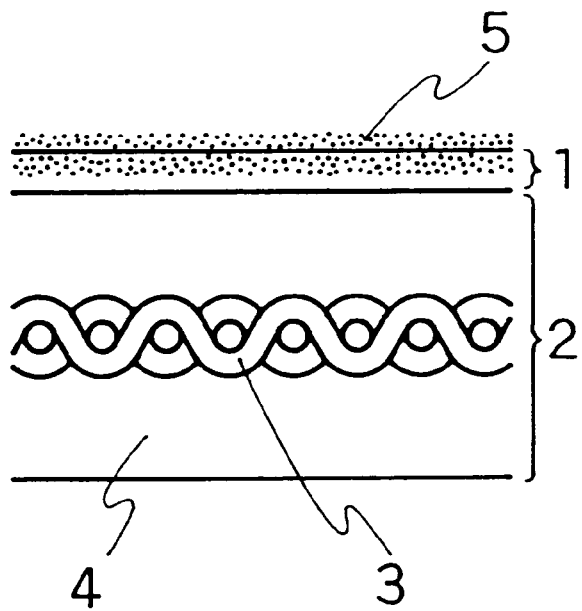

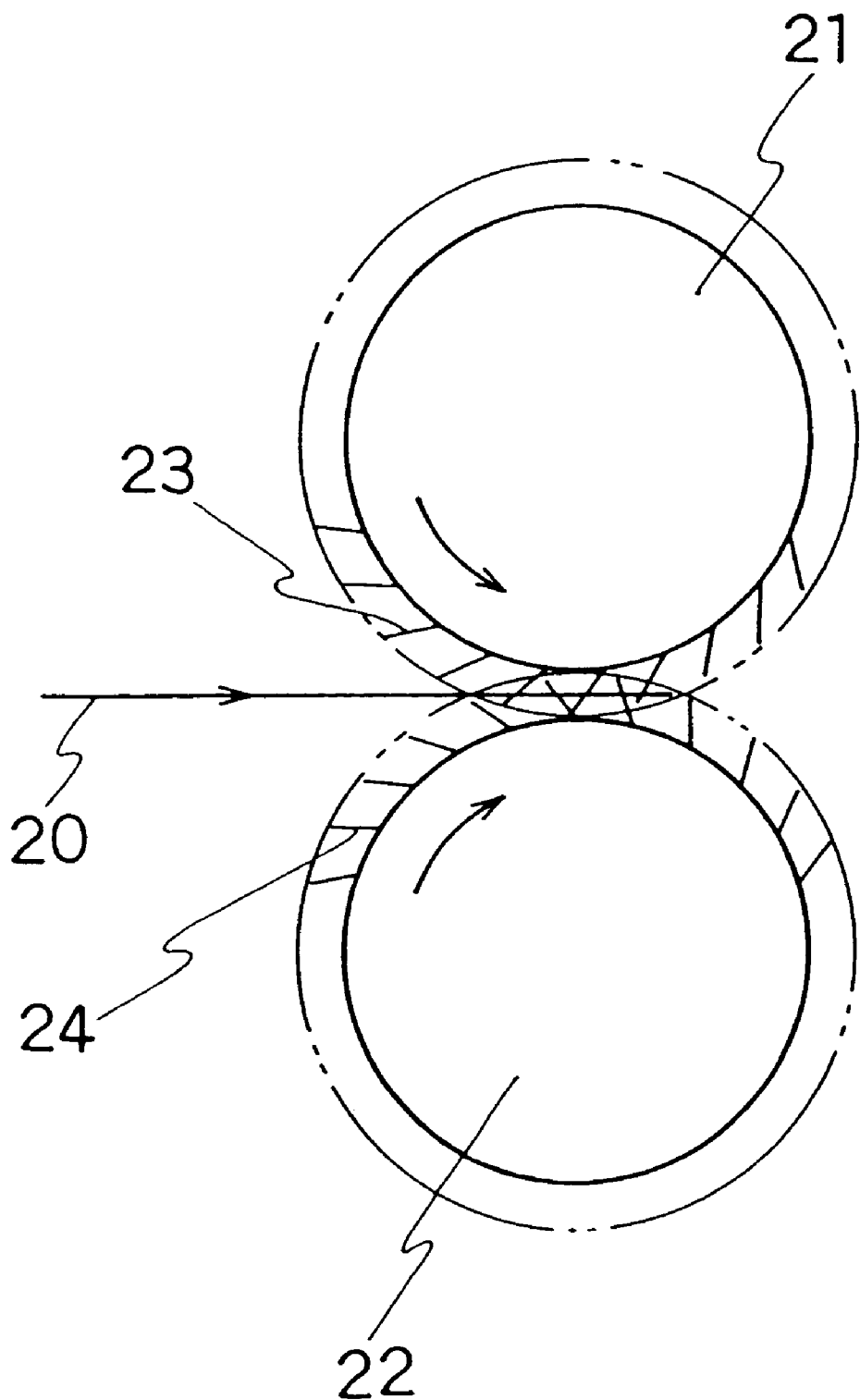

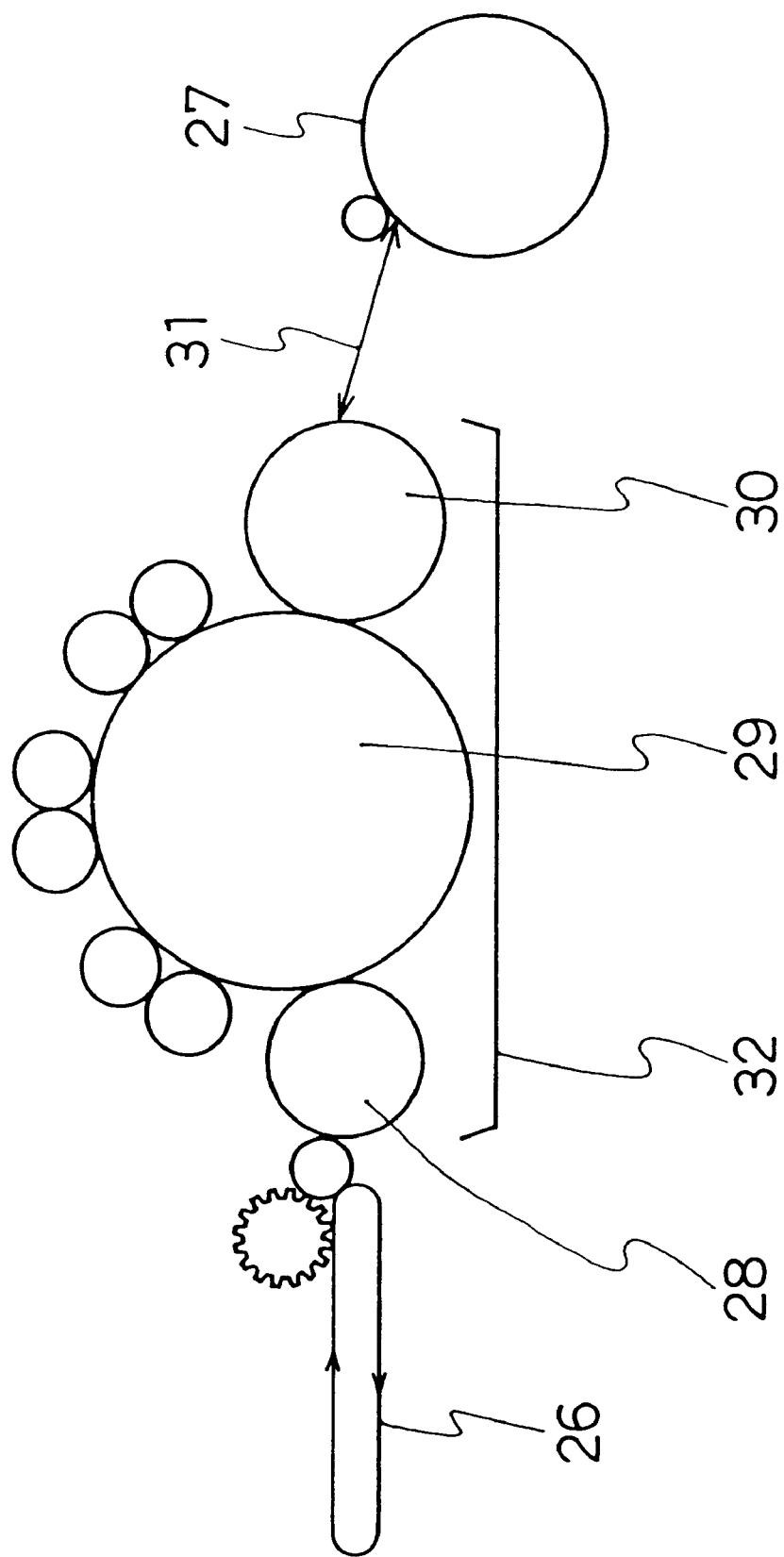

FIG. 11(a) BEFORE DUST COLLECTION
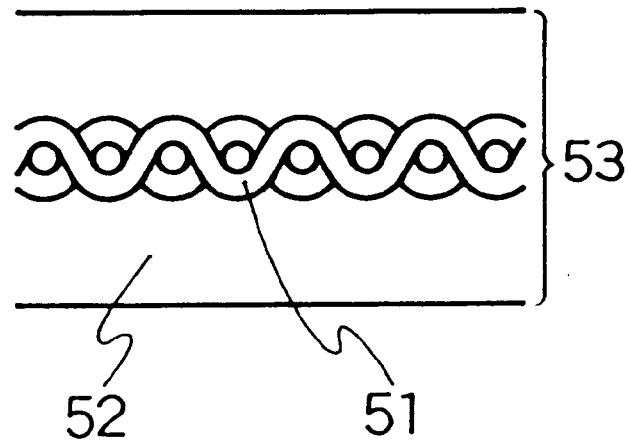
FIG. 11(b) AFTER DUST COLLECTION
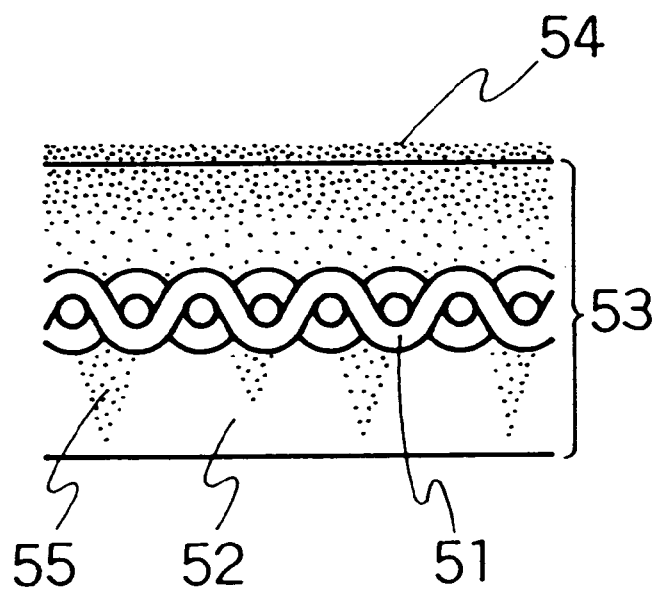

MULTI LAYERED FELT, MEMBER FORMED OF SAME, AND METHOD OF MANUFACTURING SAME

TECHNICAL FIELD

The present invention relates to a multilayered felt produced by forming a layer of polytetrafluoroethylene (PTFE) staple fibers having intermingling property on at least one surface of a felt, and a process for producing the multilayered felt. More particularly the present invention relates to members produced from the above-mentioned multilayered felt, namely, a sliding member, water repellent member, non-sticking member, member for supplying mold releasing agent in electrophotographic apparatuses and filter cloth for dust collection.

BACKGROUND ART

In recent years almost all kinds of fibers have been processed by various methods to produce felts.

Examples of the fiber are, for instance, staple fibers of polyester, meta-linked aramid, para-linked aramid, polyphenylene sulfide (PPS), polyimide and the like. The felts are produced by placing a web obtained from the mentioned staple fibers on one side of a base fabric such as a plain-woven fabric made from monofilaments, multifilaments or processed yarns of the respective fiber or sandwiching the base fabric with the webs and then, needle-punching. Those felts are used in many industrial fields, for example, for applications such as sliding member, water repellent member, non-sticking member, member for supplying mold releasing agent in electrophotographic apparatuses and filter cloth for dust collection.

Particularly when the felts are used for filter clothes for dust collection, as compared with woven fabrics having the same dust collecting efficiency, the felt has a surface porosity of about two times, and there is a merit such that air permeability per unit filtrating area becomes two times and pressure loss is small and power consumption for air blasting is small. On the other hand, in case of the filter cloth for dust collection which is produced from a felt obtained by simple needling of the above-mentioned staple fibers, there is a problem that a part of particles to be removed enters inside of the felt during use, which causes blockage of the felt and increase in pressure loss. Also there is a problem that shaking down of adhered and accumulated particles on the surface of the felt are insufficient.

In order to solve these problems, with respect to felts used for filter clothes for dust collection such as felts for bag filter, various methods for improvements mentioned below have been proposed.

(1) A method in which fluffy fibers existing on a dust-collecting surface of the felt are minimized by singeing the fluffs with a burner or calendering the surface of the felt at a temperature close to its softening temperature;

(2) A method in which needle punching is carried out to increase a density of a dust-collecting surface of the felt;

(3) A method in which a filter cloth for dust collection obtained by laminating a non-woven fabric sheet on a surface of a needled felt is used in order to reduce blockage while maintaining strength and form of the felt, the method being disclosed in JP-A-3-60712;

(4) A method in which a dispersion containing PTFE particles is applied on a dust-collecting surface of the felt, followed by fusing: and (5) A method in which a porous PTFE film is laminated on a dust-collecting surface of the felt with an adhesive.

However in the above method (1), dust particles accumulated on the dust-collecting surface of the felt become easy to be shaken down to a certain extent but it is not enough. In the above methods (2) and (3), a density of the dust-collecting surface of the felt increases (densification of surface), entering of dust particles into the inside of the felt can be prevented and the dust particles become easy to be shaken down, but the methods are still not satisfactory.

In the above method (4), since expensive PTFE is used only on the surface of the felt, it is advantageous from the viewpoint of cost. Also though shaking down of the dust particles becomes easy because of non-sticking property which PTFE possesses, a coating film of PTFE is easy to be separated and is inferior in friction property. Further in order to form the PTFE coating film, it is necessary to sinter at high temperature and thus, heat resistance is required for fibers which form the felt. Accordingly there is a problem that kind of fibers to be used is limited.

In the above method (5), there are the same merits as in the above method (4). However, since the adhesive is used, there is a problem that a porosity of the felt decreases and a pressure loss increases.

The above methods (1) to (5) direct to improvements in entering of dust particles and shaking down of the particles by densification and multilayered construction of the felt, but are not satisfactory because those methods have the mentioned problems as it is clear from the results obtained from microscopic observation of sectional view of dust-collecting surface of the felt.

An object of the present invention is to provide various members such as a filter cloth for dust collection which has small pressure loss, assures easy shaking down of dust particles and is excellent in friction property and mechanical strength; a sliding member having excellent sliding property; a water repellent member having excellent water repellency; a non-sticking member having excellent non-sticking property; and a member for supplying mold releasing agent in electrophotographic apparatuses which is excellent in air permeability, heat resistance and oil resistance, and to provide a multilayered felt used therefor and a process for producing the felt.

DISCLOSURE OF THE INVENTION

The present invention relates to a multilayered felt obtained by forming a layer of a web comprising PTFE staple fibers on at least one surface of a felt and joining the PTFE staple fibers and fibers which form the felt by intermingling.

In the present invention, it is preferable that the PTFE staple fibers have a branch and/or a loop.

In the present invention, it is further preferable that a fiber length of the PTFE staple fibers is from 3 to 25 mm.

In the present invention, it is further preferable that the above-mentioned PTFE comprises a semi-sintered PTFE.

In the present invention, it is further preferable that a weight of a web comprising the above-mentioned PTFE staple fibers is from 50 to 500 g/m².

The present invention further relates to a sliding member comprising any one of the above-mentioned multilayered felts.

The present invention further relates to a water repellent member comprising any one of the above-mentioned multilayered felts.

The present invention further relates to a non-sticking member comprising any one of the above-mentioned multilayered felts.

The present invention further relates to a member for supplying mold releasing agent in electrophotographic apparatuses comprising any one of the above-mentioned multilayered felts.

The present invention further relates to a filter cloth for dust collection comprising any one of the above-mentioned multilayered felts.

In the present invention, it is preferable that the fibers which form the felt are at least one selected from the group consisting of polyester fibers, meta-linked aramid fibers, para-linked aramid fibers, polyphenylene sulfide fibers, polyimide fibers, phenol resin fibers, fluorine-containing resin fibers, carbon fibers or glass fibers.

The present invention further relates to a process for producing a multilayered felt by placing a web of PTFE staple fibers on at least one surface of a felt and then joining the PTFE staple fibers and the fibers which form the felt by intermingling through water jet needling and/or needle punching.

In the present invention, it is preferable that the PTFE staple fibers are obtained by tearing and opening a uniaxially stretched PTFE film with a needle blade roll rotating at high speed and that immediately after the opening, the PTFE staple fibers are accumulated on the felt to be joined to form the web.

In the present invention, it is preferable that the PTFE staple fibers which form the web are previously subjected to hydrophilization and that immediately after the opening, the PTFE staple fibers are accumulated on the felt to be joined to form the web.

In the present invention, it is preferable that the web is joined to the felt after being subjected to hydrophilization.

In the present invention, it is preferable that the web is subjected to hydrophilization with a hydrophilic liquid having a surface tension of not more than 30 dyne/cm.

In the present invention, it is preferable that the above-mentioned PTFE comprises a semi-sintered PTFE.

BRIEF DESCRIPTION OF THE DRAWING

FIG. 1 is explanatory cross-sectional views of a filter cloth for dust collection obtained from the multilayered felt of the present invention, and (a) represents a view before dust collection and (b) represents a view after dust collection.

FIG. 4 is an explanatory cross-sectional view of a pair of upper and lower needle blade rolls for splitting a uniaxially stretched PTFE film.

FIG. 7 is an explanatory cross-sectional view of a carding machine for obtaining cotton-like material.

FIG. 11 is explanatory cross-sectional views of a filter cloth for dust collection obtained in Comparative Example 2, and (a) represents a view before dust collection and (b) represents a view after dust collection.

BEST MODE FOR CARRYING OUT THE INVENTION

Figure 2:
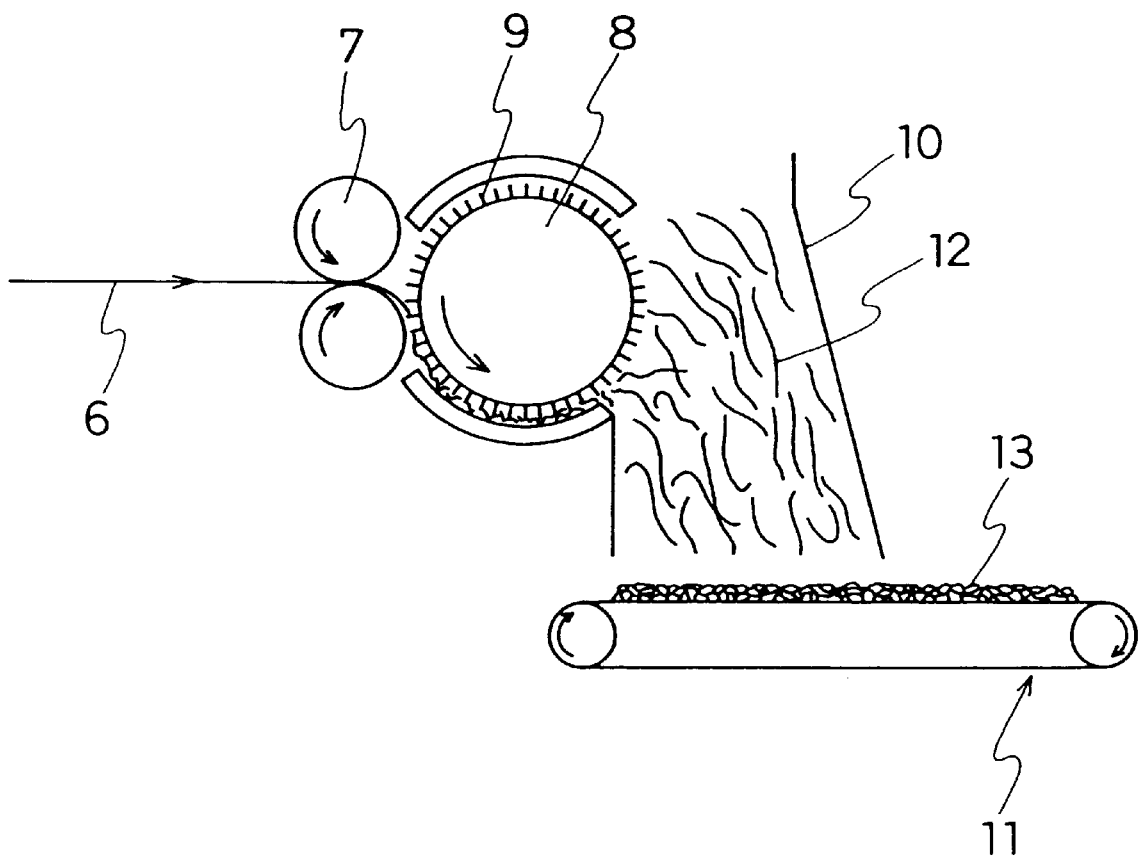
FIG. 2 is an explanatory cross-sectional view of an equipment for tearing and opening a uniaxially stretched PTFE film.
Figure 3A:
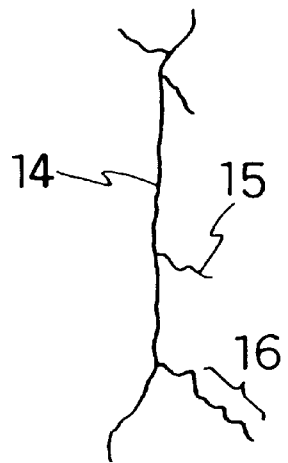
FIG. 3 is explanatory views of a PTFE staple fiber having loop and/or branch structure and good crimping property.
Figure 3B:
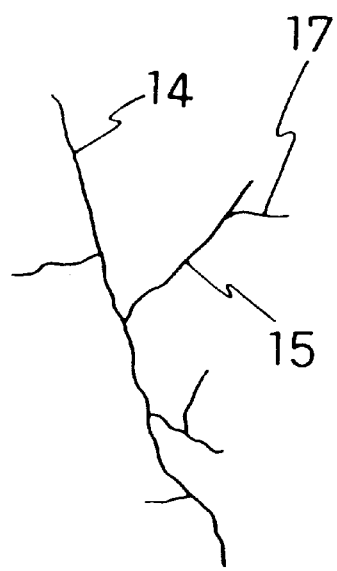
Figure 3C:
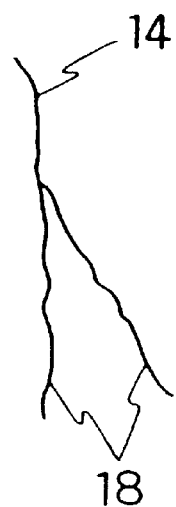
Figure 3D:
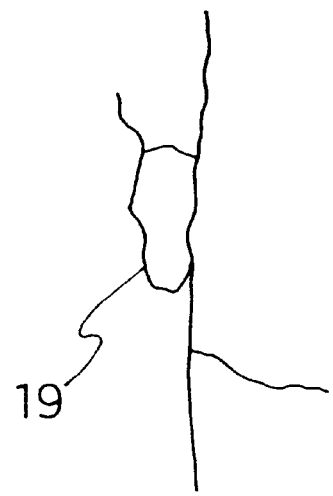

The major feature of the multilayered felt of the present invention is that at least one of the surfaces of a felt (hereinafter referred to as "base felt") is joined with a web comprising PTFE staple fibers, particularly PTFE staple fibers having a branch and/or a loop and that the staple fibers are, by making the use of their intermingling property, joined with the base felt-forming fibers, particularly the fibers around the neighborhood of the surface of the base felt. This assures excellent friction property and makes it possible to use the multilayered felt for various members.

In the present invention, according to the multilayered construction, an interface between the felt layer and the web layer of PTFE staple fibers may not be necessarily clear, and the multilayered construction means that a layer which is rich in the felt-forming fibers and a layer which is rich in the staple fibers are joined together. The surface of the felt may have the joined web incontinuously. For example, there are cases where the PTFE staple fibers are pressed into the felt layer by needle punching and on the contrary, the fibers of the felt are pulled out of the surface of the web layer of PTFE staple fibers. A ratio of such an incontinuous portion on the surface can be selected depending on applications of the felt.

The base felt which can be used in the present invention is obtained from usual fibers by known methods, for example, by needle punching, and commercially available felts can be used.

Examples of the base felt-forming fiber are, for instance, animal fibers such as wool; vegetable fibers such as cotton; inorganic fibers such as carbon fiber and glass fiber; organic synthetic fibers such as polyester fiber, meta-linked aramid fiber, para-linked aramid fiber, polyphenylene sulfide (PPS) fiber, polyimide fiber, phenol resin fiber, fluorine-containing resin fibers including sintered PTFE fiber and melt-spinning fiber such as tetrafluoroethylene-hexafluoropropylene copolymer fiber, tetrafluoroethylene-perfluoro(alkyl vinyl ether) copolymer fiber or ethylene-tetrafluoroethylene copolymer fiber, polyolefin fibers such as polyethylene fiber and polypropylene fiber, acrylic fiber and nylon fiber; and the like. Among them, in case of a filter cloth for dust collection, one or a mixture of two or more of polyester fiber, meta-linked aramid fiber, para-linked aramid fiber, polyphenylene sulfide fiber, polyimide fiber, phenol resin fiber, fluorine-containing resin fiber, carbon fiber and glass fiber is preferable.

In the center region of the base felt is preferably used a base fabric comprising a woven fabric obtained by plain weaving, etc. from the viewpoint of improvement of strength. Examples of the preferred fibers used for the base fabric are the fibers mentioned above.

Examples of the PTFE staple fiber used in the present invention are, for instance, a fiber obtained from an aqueous dispersion prepared by emulsion polymerization of tetrafluoroethylene (TFE) through emulsion-spinning step and sintering step; a fiber obtained from a PTFE film through sintering step, slitting step, stretching step, etc.; a fiber obtained from a PTFE film through sintering step, stretching step, tearing step, etc.; a fiber obtained from a PTFE film through sintering step, stretching step, splitting step, cutting step, etc.; and the like.

From the viewpoint of excellent intermingling property and property for preventing falling off of fibers, preferable is a staple fiber obtained from a PTFE film through sintering or semi-sintering step, stretching step, tearing and opening steps by a needle blade roll rotating at high speed, etc., because the fiber has a branch and/or a loop.

Further, a staple fiber obtained through semi-sintering step is preferable from the points that since the fiber having a large stretching ratio (3 to 6 times that of a fiber obtained through a sintering step) and a small specific gravity can be obtained, a weight of a web can be made smaller and that since a self-sticking property is easy to be exhibited, fluffing can be reduced by heat pressing and smoothness is excellent.

In the present invention, the PTFE staple fibers can be used in combination with other fibers, for example, inorganic fibers, heat resistant synthetic fibers, fluorine-containing resin fibers, polyolefin fibers, polyester fibers or natural fibers or a mixture of two or more thereof.

A mixing ratio of the other fibers is from 10 to 90% by weight, preferably from 10 to 75% by weight, more preferably from 15 to 75% by weight. When the mixing ratio is less than 10% by weight, there is a tendency that intermingling property is not improved and the other fibers become merely impurities. When more than 90% by weight, there is a tendency that characteristics of PTFE are not exhibited.

The purpose of using two or more of other fibers is to produce a multilayered felt suitable for its final application by changing characteristics such as intermingling strength, apparent density and air permeability of the multilayered felt and giving electric conductivity to the felt.

Examples of the inorganic fiber are, for instance, carbon fiber, glass fiber, metal fiber, asbestos, rock wool, etc. From the viewpoint of fiber length, carbon fiber, glass fiber and metal fiber are preferred.

Examples of the metal fiber are, for instance, stainless steel fiber, copper fiber, steel fiber, etc. From the viewpoint of corrosion resistance, a stainless steel fiber is preferred.

Examples of the preferred heat resistant synthetic fiber are, for instance, polyphenylene sulfide (PPS) fiber, polyimide (PI) fiber, para-linked aramid fiber, meta-linked aramid fiber, phenol resin fiber, polyarylate fiber, carbonated fiber, fluorine-containing resin fiber, etc.

Examples of the preferred fluorine-containing resin fiber are, for instance, tetrafluoroethylene-perfluoro(alkyl vinyl ether) copolymer (PFA) fiber, tetrafluoroethylene-hexafluoropropylene copolymer (FEP) fiber, ethylene-tetrafluoroethylene copolymer (ETFE) fiber, polyvinyl fluoride (PVF) fiber, polyvinylidene fluoride (PVdF) fiber, polychlorotrifluoroethylene (PCTFE) fiber, ethylene-chlorotrifluoroethylene copolymer (ECTFE) fiber, etc.

Examples of the preferred polyolefin fiber are, for instance, polyethylene fiber, polypropylene fiber, etc. From the viewpoint of purity, polyethylene fiber and polypropylene fiber are preferable.

Examples of the polyester fiber are, for instance, polyethyleneterephthalate fiber, polybutyleneterephthalate fiber, etc. From economical point of view for production in industrial scale, polyethyleneterephthalate fiber is preferable.

In addition, for example, nylon fiber, urethane fiber, etc. can be used.

Examples of the natural fiber are, for instance, wool, cotton, cashmere, angola rabbit hair, silk, hemp, pulp, etc. From the viewpoint of fiber length necessary for intermingling property, wool and cotton are preferred.

A weight of the web comprising PTFE staple fibers is preferably from 50 to 500 g/m$^2$ from the points that inherent characteristics of PTFE can be maintained and that there can be obtained effects such as friction resistance in each application of the present invention and further cost merit, and is further preferably from 50 to 250 g/m$^2$ from the point that a uniform web can be obtained by a carding machine mentioned hereinafter.

When the weight of the web comprising PTFE staple fibers is decreased to as small as about 50 g/m$^2$ to about 100 g/m$^2$, a length of the staple fiber is preferably not more than 25 mm from the points that mixing of fibers in web is good and a relatively uniform web can be obtained, more preferably from 3 to 25 mm, further preferably from 3 to 20 mm, particularly preferably from 3 to 15 mm.

Such a short PTFE staple fiber can be obtained from a PTFE film by, for example, a method comprising the sintering step, stretching step, splitting step, cutting step, etc. or a method comprising the sintering step or semi-sintering step, stretching step, tearing step and opening step by a needle blade roll rotating at high speed, etc. or the like method.

When the joining step is carried out, for example, through water jet needling mentioned later by using PTFE staple fibers having a short length, there is a problem that the fibers are easy to be scattered by high pressure water. The present inventors have found that the problem can be solved when the PTFE staple fibers are previously subjected to hydrophilization before the joining step by the water jet needling.

Examples of the method for hydrophilizing PTFE staple fibers are, for instance, a method disclosed in JP-B-5-21009 and JP-B-5-21010, in which the hydrophilization is carried out by surface-treating PTFE with a non-metallic ion type fluorine-containing surfactant and then crosslinking until the surfactant becomes insoluble in an aqueous dispersion of ammonium salt of perfluoroalkylate so that the surfactant is not removed; a method disclosed in JP-A-4-249548, in which a fluorine-containing compound having perfluoroalkyl group and hydrophilic group and the surface of PTFE are crosslinked with a compound having an isocyanate group to produce a hydrophilic fluorine-containing resin material having a crosslinked structure; a method disclosed in JP-A-4-94724, in which the hydrophilization is carried out on the surface of PTFE through sputtering and corona discharging; and the like. In the present invention, those methods can be used.

Example of the other method is a method of using a hydrophilic liquid having a surface tension of not more than 30 dyne/cm. When the surface tension of the hydrophilic liquid is not more than 30 dyne/cm, a hydrophobic PTFE staple fiber easily gets wet. Examples of the hydrophilic liquid are, for instance, alcohols such as methanol, ethanol and isopropyl alcohol (IPA) and aqueous solutions of these alcohols.

Those methods for hydrophilizing are preferably carried out at any stages before the joining step by the water jet needling, for example, immediately after the PTFE film production step; immediately after uniaxially stretching step of the film; immediately after tearing and opening step of the film or splitting and cutting step; or immediately after placing the web comprising PTFE staple fibers on at least one surface of the base felt mentioned later. Particularly in case of the use of the above-mentioned hydrophilic liquid, it is preferable to dip into the hydrophilic liquid immediately after placing the web from the point that the PTFE staple fibers are hardly scattered by the water jet needling in the joining step following the web placing step. In addition to the dipping method, the hydrophilic liquid is used by coating, spraying, etc.

The multilayered felt of the present invention has such a cross-sectional structure as explanatorily described, for example, in FIG. 1(a). In FIG. 1(a), numeral 1 represents a layer (dense layer) of a web comprising PTFE staple fibers formed on at least one surface of a base felt 2. The base felt 2 comprises a base fabric 3 in its center region and a fiber portion 4. FIG. 1(b) shows explanatorily the cross-section of the multilayered felt of the present invention shown in FIG. 1(a) after used as a filter cloth for dust collection as described later. Numerals 1 to 4 are the same as in above. Numeral 5 represents particles of dusts.

The process for producing the multilayered felt of the present invention is explained hereinbelow. Unless otherwise noted, each material used are those mentioned above.

Production of Base Felt (A) The base felt which can be used in the present invention is one obtained from usual fibers by usual method, for example, by needle punching, and commercially available felts can be used.

Examples of the base felt-forming fiber are, for instance, animal fibers such as wool; vegetable fibers such as cotton; inorganic fibers such as carbon fiber and glass fiber; organic synthetic fibers such as polyester fiber, meta-linked aramid fiber, para-linked aramid fiber, polyphenylene sulfide (PPS) fiber, polyimide fiber, phenol resin fiber, fluorine-containing resin fibers including sintered PTFE fiber and molten spinning fiber such as tetrafluoroethylene-hexafluoropropylene copolymer fiber, tetrafluoroethylene-pefluoro(alkyl vinyl ether) copolymer fiber or ethylene-tetrafluoroethylene copolymer fiber, polyolefin fibers such as polyethylene fiber and polypropylene fiber, acrylic fiber and nylon fiber, and the like. Among them, in case of a filter cloth for dust collection, one or a mixture of two or more of polyester fiber, meta-linked aramid fiber, para-linked aramid fiber, polyphenylene sulfide fiber, polyimide fiber, phenol resin fiber, fluorine-containing resin fiber, carbon fiber and glass fiber is preferable.

It is preferable from the viewpoint of improvement of strength that the center region of the base felt comprises a base fabric such as a plain-woven fabric. Examples of the preferred fiber used for such a base fabric are the fibers mentioned above.

Production of Web to be Joined (B) After stretched by 6 to 30 times, a semi-sintered PTFE film is torn and opened by a machine shown in FIG. 2.

In FIG. 2, numeral 6 represents a uniaxially stretched PTFE film, numeral 7 represents a pinch roll, numeral 8 represents a needle blade roll, numeral 9 represents a needle, numeral 10 represents a hood, numeral 11 represents a transfer belt, numeral 12 represents an opened PTFE staple fiber and numeral 13 represents a cotton-like material comprising PTFE staple fibers.

The above-mentioned staple fiber obtained by tearing and opening has a shape as explanatorily shown in FIG. 3. In FIG. 3, numeral 14 represents a PTFE staple fiber constituting the cotton-like material, numeral 16 represents a crimp, numerals 15, 17 and 18 represent branches and numeral 19 represents a loop.

By such tearing and opening, there can be obtained a web which has a weight of 50 to 500 g/m$^2$ and comprises a cotton-like material of PTFE staple fibers having loop structure and/or branch, being excellent in crimping property and having a length of 5 to 150 mm.

Production of Multilayered Felt (C) The multilayered felt of the present invention can be obtained by placing the web obtained in above (B) on the base felt shown in above (A) and then joining the felt-forming fibers and the web-forming staple fibers by intermingling them with a water jet needling machine. Examples of the conditions for the water jet needling are those used for usual cotton fibers.

For producing the web comprising the semi-sintered PTFE staple fibers to be joined to the base felt, it is preferable to use the tearing and opening machine shown in FIG. 2 from the point that there is neither blocking nor depositing of the fibers in the machine. Also the use of the machine is further preferred because simplification of the steps can be achieved since the fibers can be accumulated directly on the base felt. Further in that case, the intermingling may be carried out with such a water jet needling machine as mentioned above after accumulating the staple fibers temporarily on a spun bond non-woven fabric or a woven fabric having air permeability instead of the base felt and then placing on the base felt. By combination use of needle punching by metal needles, the intermingling advances more and particularly the staple fibers are further intermingled with the fibers inside the base felt to give a strong multilayered felt.

Also by smoothing the surface of the layer comprising PTFE staple fibers of the multilayered felt obtained by the method mentioned above, the felt having a lower friction coefficient and excellent mold release property can be obtained.

Means for surface smoothing may be one which can lower the friction coefficient and make the mold release property more excellent. For example, there may be used a continuous belt type laminator (for instance, JR: 9005 available from Asahi Seni Kikai Kabushiki Kaisha) which has nip rolls being capable of heating and nipping by surface pressure. Also a method for pressing successively with a heated iron may be used, and an electric iron and a trouser press may be used. Degree of surface smoothness can be optionally changed by pressure or pressing time at a temperature in the range of 100° to 360° C.

The multilayered felt obtained by the method mentioned above has the dense layer of the web comprising PTFE staple fibers in its surface region. Since the fibers have loop structure and/or branch, intermingling property with the base felt-forming fibers is excellent. The staple fibers have particularly lower friction coefficient and have elasticity and flexibility, and thus maintain characteristics which PTFE inherently possesses.

Those multilayered felts can be suitably used for, for example, filter cloth for dust collection, sliding member, water repellent member, non-sticking member, member for supplying mold releasing agent in electrophotographic apparatuses, etc.

As the filter cloth for dust collection, the felt can be used, for example, for a bag filter. The bag filter can be obtained, for example, by sewing the above-mentioned multilayered felt into the form of bag having a diameter of 100 to 300 mm and a length of 0.5 to 5 m so that the PTFE staple fiber layer faces outside and then, inside the bag, inserting a shape holding frame called retainer. When a fluid (liquid or gas) containing particles such as dusts is supplied from the side of the PTFE staple fibers, the dusts are filtrated and the clean fluid can be released outside from an opening of the bag filter. Also the staple fiber layer may face inside of the filter. In that case, the fluid flows reversely. Further in order to increase the filtrating area, the multilayered felt may be used in the form of pleat. Examples of the preferred base felt-forming fibers of the bag filter are polyester fiber, meta-linked aramid fiber, para-linked aramid fiber, polyphenylene sulfide fiber, polyimide fiber, phenol resin fiber, fluorine-containing resin fiber, carbon fiber or glass fiber or a mixture of two or more thereof.

Since the PTFE staple fibers are joined firmly by intermingling with the base felt-forming fibers, when the multilayered felt is used for the bag filter, a trouble of damaging the bag filter can be decreased because the felt is excellent in mechanical strength such as resistance to inflation, vibration, abrasion, etc. which are caused by pulse jet air or backwash air.

Also as a filter cloth for a heat resistant bag filter, there have been widely used a single layer felt comprising meta-linked aramid fiber, PPS fiber, polyimide fiber, PTFE fiber, or the like. On the other hand, the PTFE staple fiber has excellent characteristics, but is expensive. However, for example, by using a felt comprising only meta-linked aramid fiber as the base felt, and using the PTFE staple fibers only in the surface region of the felt, the obtained multilayered felt is a filter cloth for a heat resistant bag filter which has combined merits of excellent characteristics of PTFE staple fibers and inexpensive base material.

Since the above-mentioned filter cloth for dust collection is composed of the layer of PTFE staple fibers on its dust-collecting surface, it has excellent characteristics, namely a small surface energy. Thus particles such as dusts are easily removed, for example, cohesion of wet dust does not occur and property for shaking down of dusts is excellent.

Also since the dense surface layer is formed of PTFE staple fibers, particles such as dusts do not enter deep into the base felt, and increase in pressure loss can be maintained at a low level for a long period of time.

The above-mentioned sliding member can be produced by sticking the base felt side of the multilayered felt to a plane portion, curved portion, folded portion, etc. of a member of, for example, metal, ceramic, glass, wood or plastic by using an adhesive. In this sliding member, the surface of the PTFE staple fiber layer is used as sliding surface.

The sliding member is characterized in that it has both elasticity and flexibility of the base felt and low friction coefficient of the surface of the PTFE staple fiber layer. For example, in opening and closing of a curved window glass of cars, by using the sliding member on a window frame, a clearance between the glass and the frame can be sealed and the window can be opened and closed by small force. Further the sliding member can be used as a sliding surface contacting a rotating floppy disc and as a sliding surface of artificial skiing slope or playing slide.

Examples of the preferred base felt-forming fibers of the sliding member are polyolefin fiber such as polyethylene fiber or polypropylene fiber, nylon fiber, polyester fiber and meta-linked aramid fiber.

The above-mentioned water repellent member is one obtained only by cutting the mentioned multilayered felt, one obtained by sewing a cut felt so that the surface of the PTFE staple fiber layer becomes water repellent surface, one obtained by laminating the surface of the base felt to cloth, wood, concrete wall, etc. with an adhesive irrespective of a cut or non-cut felt, or the like.

These water repellent members have elasticity, flexibility and air permeability of the base felt, and are characterized in that they have permanent water repellency as compared with application of a water repelling agent. The water repellent member obtained only by cutting the multilayered felt can be used for a table cloth, etc. and the member obtained by sewing can be used for felt hat, gloves, rainwear, material for clothes, etc. Also by adhering the base felt side of the multilayered felt to building materials, the obtained materials can be used as wall materials, carpet etc.

Examples of the preferred base felt-forming fibers of these water repellent members are animal fiber such as wool, vegetable fiber such as cotton, nylon fiber, polyolefin fiber such as polyethylene fiber or polypropylene fiber, polyester fiber and acrylic fiber.

The above-mentioned non-sticking member can be used for a non-sticking roll, for example, an elastic nip roll for a cloth or paper containing starch, etc. which is produced by cutting the above-mentioned multilayered felt into the form of ribbon and then adhering the base felt side surface to a surface of a rolled material so that other surface of the felt is non-sticking PTFE staple fiber layer. Also the multilayered felt cut can be processed and used for, for example, an ironing stand. The ironing stand is necessary to pass steam through it and requires proper elasticity and it is required that cloth is not stuck to the ironing stand with starch. When the non-sticking member is used for such applications, good permeability of steam and non-sticking property for starch can be obtained, and since proper elasticity is available, ironing work is easy.

Examples of the preferred base felt-forming fibers of the non-sticking members are nylon fiber, polyester fiber, meta-linked aramid fiber and phenol resin fiber.

The member for supplying mold releasing agent in electrophotographic apparatuses is obtained by cutting the multilayered felt into the form of ribbon and winding the cut felt on a rolled material impregnated with a mold releasing agent, for example, silicone oil so that the PTFE staple fiber layer becomes an outer surface, and thus can be used as a member which makes it possible to bleed the mold releasing agent slowly onto the surface of the PTFE staple fiber layer and apply the mold releasing agent to the surface of a heating roll or a press roll. Therefore toner offset can be prevented.

Examples of the preferred base felt-forming fiber of the member for supplying mold releasing agent in electrophotographic apparatuses are polyester fiber and meta-linked aramid fiber.

In the present invention, the above-mentioned multilayered felt can be used in the form of plate. For example, the multilayered felt of 500 mm×500 mm may be framed with metal around its circumference and sealed so that liquid does not leak from the circumference. Also the both sides of the multilayered felt may be covered with a net for reinforcement so as to resist to a pressure of the liquid. Further in order to increase a filtrating area, the multilayered felt in the form of pleat may be used.

When the multilayered felt of the present invention is used in the form of plate and particularly fluid is liquid, example of its application is a filter cloth for filter press. In that case, examples of the preferred base felt-forming fiber are polyolefin fibers such as polyethylene fiber and polypropylene fiber, polyester fiber, polyimide fiber and PTFE fiber. When the PTFE fiber is used as the base felt, it is preferable that the PTFE fiber is previously subjected to hydrophilization. Further when chemical resistance is particularly required, preferable are polyimide fiber, PTFE fiber and carbon fiber.

In any cases mentioned above, it is preferable that the surface of the PTFE staple fibers of the filter cloth is brought into contact with the fluid containing particles such as dusts.

The present invention is then explained by means of Examples, but is not limited to them.

EXAMPLE 1 AND COMPARATIVE EXAMPLES 1 to 2

Joining of Base Felt Comprising PTFE Staple Fibers and Web Comprising PTFE Staple Fibers Production of Base Felt (1) The PTFE fine powder (POLYFLON F104 available from Daikin Industries, Ltd.) was mixed with a liquid additive (IP2028 available from Idemitsu Sekiyu Kagaku Kabushiki Kaisha), and then aging was done at room temperature for two days and preforming was conducted by compression to give a block. The preformed article in the form of block was paste-extruded and calendered, and then the additive was removed by heating and drying to make an unsintered film of 190 mm wide×60 $\mu$m.

(2) The unsintered film was heat-treated for 60 seconds in a salt solution bath of 360° C., and a sintered film having a width of 165 mm and a thickness of 60 $\mu$m was obtained.

(3) The sintered film was stretched by 5 times in the longitudinal direction by means of two rolls of 320° C. having different rotation speeds, and thus a uniaxially stretched film of 110 mm wide×18 $\mu$m thick was obtained.

(4) Then the uniaxially stretched film was split by means of a pair of upper and lower needle blade rolls shown in FIG. 4. In FIG. 4, numeral 20 represents the uniaxially stretched PTFE film, numerals 21 and 22 represent the needle blade rolls and numerals 23 and 24 represent needles provided on the circumference of the needle blade roll.

The uniaxially stretched film 20 was split by means of a pair of upper and lower needle blade rolls 21 and 22 shown in FIG. 4 under the conditions of a feeding speed (v1) of the film 20 of 8 m/min, a peripheral speed (v2) of the needle blade rolls 21 and 22 of 64 m/min and a v2/v1 ratio of 8 times.

Figure 5:
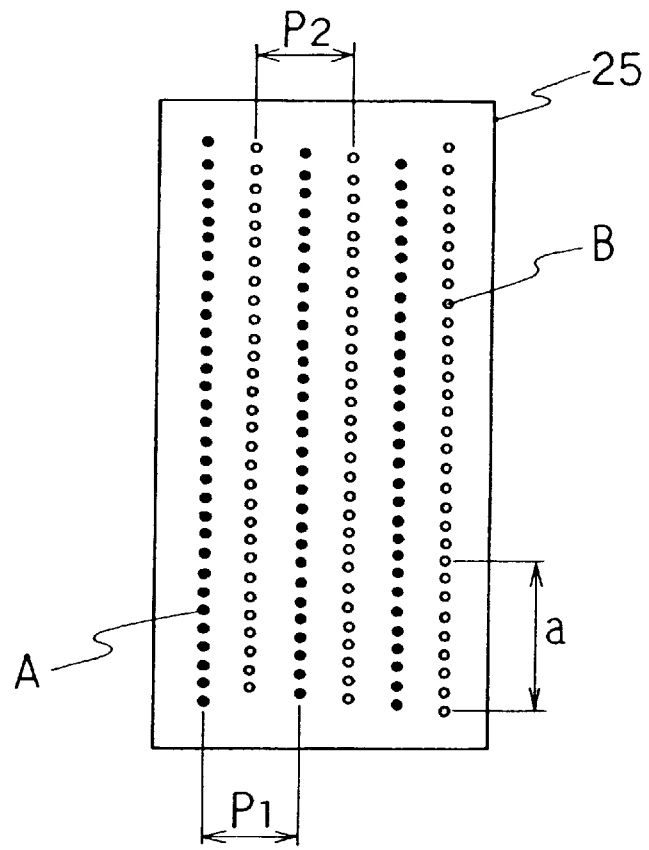
FIG. 5 is an explanatory plan view of a PTFE film punched with needles of the needle blade rolls of FIG. 4.
Figure 6:
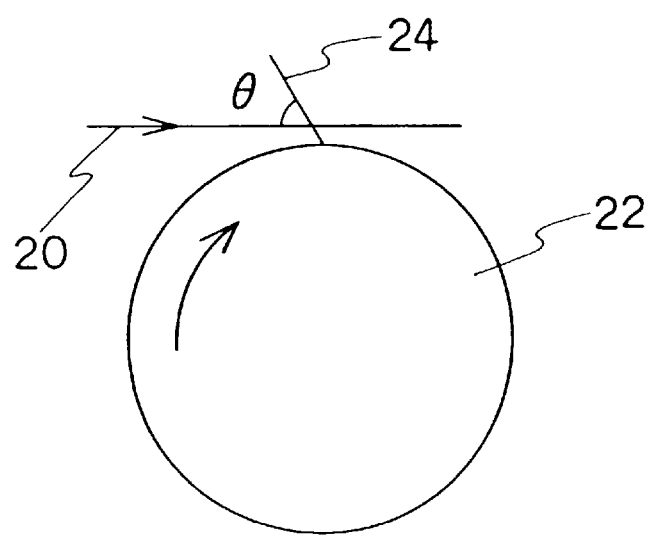
FIG. 6 is an explanatory cross-sectional view of an angle of the needle of the needle blade roll of FIG. 4 to the PTFE film.

The shape of the needle blade rolls 21and 22, and the arrangement and engagement of the needles 23 and 24 of the upper and lower needle blade rolls were as mentioned below. When the film 20 was passed at the same speed as a rotation of the upper and lower needle blade rolls 21 and 22 of FIG. 4, a punched film 25 as shown in FIG. 5 was obtained. In FIG. 5, A is a needle hole of the upper needle blade roll 21, and the pitch P1 of the holes in the circumferential direction was 2.5 mm. B is a needle hole of the lower needle blade roll 22, and the pitch P2 thereof was 2.5 mm just like P1. The number a of needles in the longitudinal direction of the roll was 13 per 1 cm. As shown in FIG. 6, the angle ($\theta$) of the needle to the film 20 being fed between the needle blade rolls 21 and 22 was so set as to be an acute angle (60°). As it is seen from FIG. 5, the upper and lower needle blade rolls were so set that the needles of the upper and lower needle blade rolls 21 and 22 were arranged alternately in the circumferential direction of the rolls. The length of the needle blade rolls in the longitudinal direction was 250 mm, and the diameter of the rolls was 50 mm at the ends of the needles.

(5) The split uniaxially stretched film was cut to 70 mm in the longitudinal direction, and a cotton-like material can be produced by using a carding machine (model SC360-DR available from Daiwa Kiko Kabushiki Kaisha) shown in FIG. 7. In FIG. 7, numeral 26 represents a cotton mass conveyor, numeral 27 represents a drum, numeral 28 represents a taker-in roller, numeral 29 represents a cylinder, numeral 30 represents a doffer, numeral 31 represents a card crossing distance and numeral 32 represents a cover. By passing the split uniaxially stretched film through the carding machine, there was obtained a cotton-like material which comprises the fibers (staple fibers) shown in FIG. 3 and having crimping property and at least one loop structure and/or branch per 5 cm.

An average diameter of the obtained fibers was measured by irradiating laser rays to the fibers and determining diameters of 2,000 fibers selected at random by using projections of the fibers with an automatic fiber diameter meter (FDA-200 available from Peyer Co., Ltd.). The obtained average diameter was 29 $\mu$m.

(6) About 2% by weight of antistatic agent Elimina (available from Maruzen Yuka Shoji Kabushiki Kaisha) was sprayed onto the obtained cotton-like material, and then the material was passed through the carding machine shown in FIG. 7 to give a web having a weight of 250 g/m$^2$. At that time, the revolutions of the cylinder, doffer and drum were 180 rpm, 6 rpm and 5 rpm, respectively.

(7) The obtained web was placed on a woven fabric (base fabric) of Cornex C01700 (available from Teijin, Ltd.) having a weight of 110 g/m$^2$. Further a web having a weight of 250 g/m$^2$ was produced in the same manner as in (6) above, and placed on another surface of the base fabric. Then a needle-punched non-woven fabric (base felt) was produced by means of a needle punching machine (available from Daiwa Kiko Kabushiki Kaisha) with 750 needles/cm$^2$.

This base felt (weight: 610 g/m$^2$) was used as a single felt of Comparative Example 1, and the base felt having a weight of 710 g/m$^2$ was used as a single felt of Comparative Example 2. The multilayered felt of Example 1 was, as mentioned below, a multilayered felt obtained by placing, on the felt of Comparative Example 1, a web comprising PTFE staple fibers and having a weight of 100 g/m$^2$ and then water jet needling for intermingling.

Production of Web for Joining (8) Then a semi-sintered film having a width of 170 mm and a thickness of 60 $\mu$m was produced under the same conditions as in above (2) except that the temperature was changed to 337° C. and the heat-treating time was changed to 42 seconds.

(9) A stretched film having a width of 120 mm and a thickness of 20 $\mu$m was produced by uniaxially stretching a semi-sintered film under the same conditions as in above (3) except that the stretching ratio was changed to 12.5 times and the temperature for stretching was changed to 300° C.

(10) By employing the equipment for tearing and opening a uniaxially stretched film as shown in FIG. 2, the uniaxially stretched PTFE film 6 was torn and opened by means of the needle blade roll 8 rotating at high speed. Thus a web 13 which was the same cotton-like material of staple fibers having a loop structure and/or a branch as shown in FIG. 3 was produced. A weight was 100 g/m$^2$ and an average diameter of the staple fibers was 21 $\mu$m.

The needle blade roll 8 shown in FIG. 2 differs from the needle blade roll used in above (4) and has the structure mentioned below.

Figure 8A:
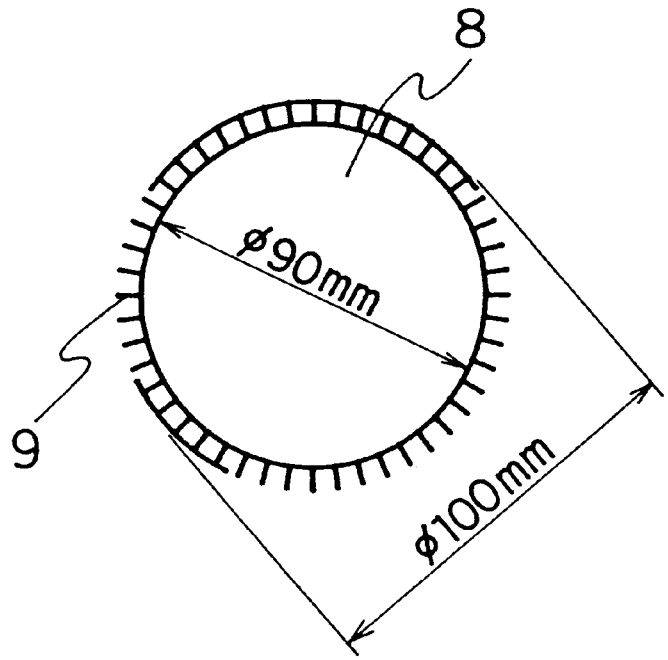
FIG. 8 is explanatory views showing a cross-sectional view (a) and a plan view (b) of the needle blade roll of the tearing and opening equipment of FIG. 2.
Figure 8B:
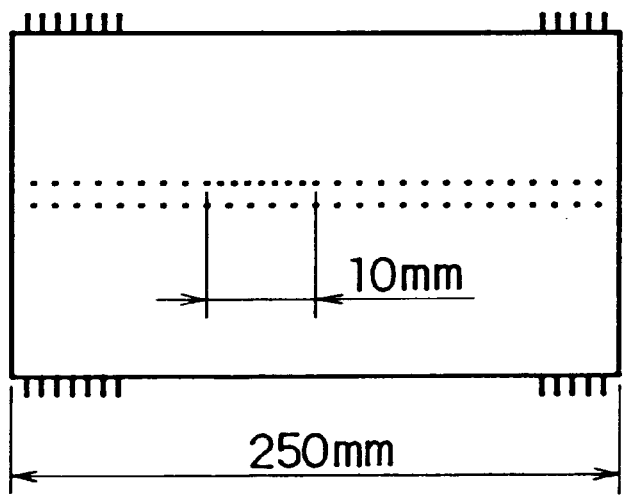

FIG. 8(a) is for explaining the needle blade roll 8 shown in FIG. 2. In FIG. 8(a), numerals 8 and 9 are the same as above. As shown in FIG. 8(a), the needle blade roll 8 is a metal roll produced by dividing a cylinder of 90 mm outside diameter×250 mm length into 90 parts on its circumference and providing sharp needles 9 at intervals of 8 needles per 1 cm in the longitudinal direction so that the outside diameter of the roll at the end of the needle is 100 mm. The rotational speed of the needle blade roll 8 is 3,000 rpm and the film feeding speed is 2 m/min. FIG. 8(b) is a plan view of the needle blade roll shown in FIG. 8(a).

Production of Multilayered Felt

(11) The web produced in above (10) was placed on the base felt produced in above (7), and then the web-forming staple fibers and the base felt-forming fibers were intermingled by means of a water jet needling machine (available from Perfojet Co., Ltd. (France)). Thus a joined non-woven fabric (multilayered felt) of a two-layered structure comprising a bulky layer obtained in above (7) and a dense layer obtained in above (10) was produced.

Such a two-layered structure can be seen by comparing state of entering particles in evaluations of performance mentioned later and air permeability shown in Table 1.

Conditions for Water Jet Needling

The nozzles of the water jet needle were so arranged that 800 nozzles having 100 μm diameter were set at intervals of 0.6 mm in the transverse direction and at three rows in the longitudinal direction. The pressure was 80 kg/cm², 120 kg/cm² and 170 kg/cm² at the first, second and third rows, respectively.

The following tests were carried out with respect to the multilayered felt obtained in Example 1 of the present invention and the multilayered felts obtained in Comparative Examples 1 and 2.

Air permeability: Measurement was carried out with a Frazier type air permeability tester according to JIS L1096.

Pressure loss: Measurement was made at 3.3 cm/sec of a filtrating air velocity by using an equipment shown in FIG. 9

Thickness: A thickness was measured by applying a load of 20 g/cm² by using a compressive elasticity tester (available from Nakayama Denki Sangyo Kabushiki Kaisha). Measurement was made at 10 points selected at random and an average of them was used. The results are shown in Table 1.

a pressure gauge, numeral 38 represents a header tank, numeral 39 represents a solenoid valve, numeral 40 represents a valve, numeral 41 represents a compressor, numeral 42 represents a nozzle for pulse injection, numeral 43 represents a HEPA filter, numeral 44 represents an orifice, numeral 45 represents a blower, numeral 46 represents particles of dusts (fly ash), numeral 47 represents a bag house proper and numeral 48 represents particles of dusts not collected.

Dusts were supplied to a filter cloth under the following conditions.

Figure 10:
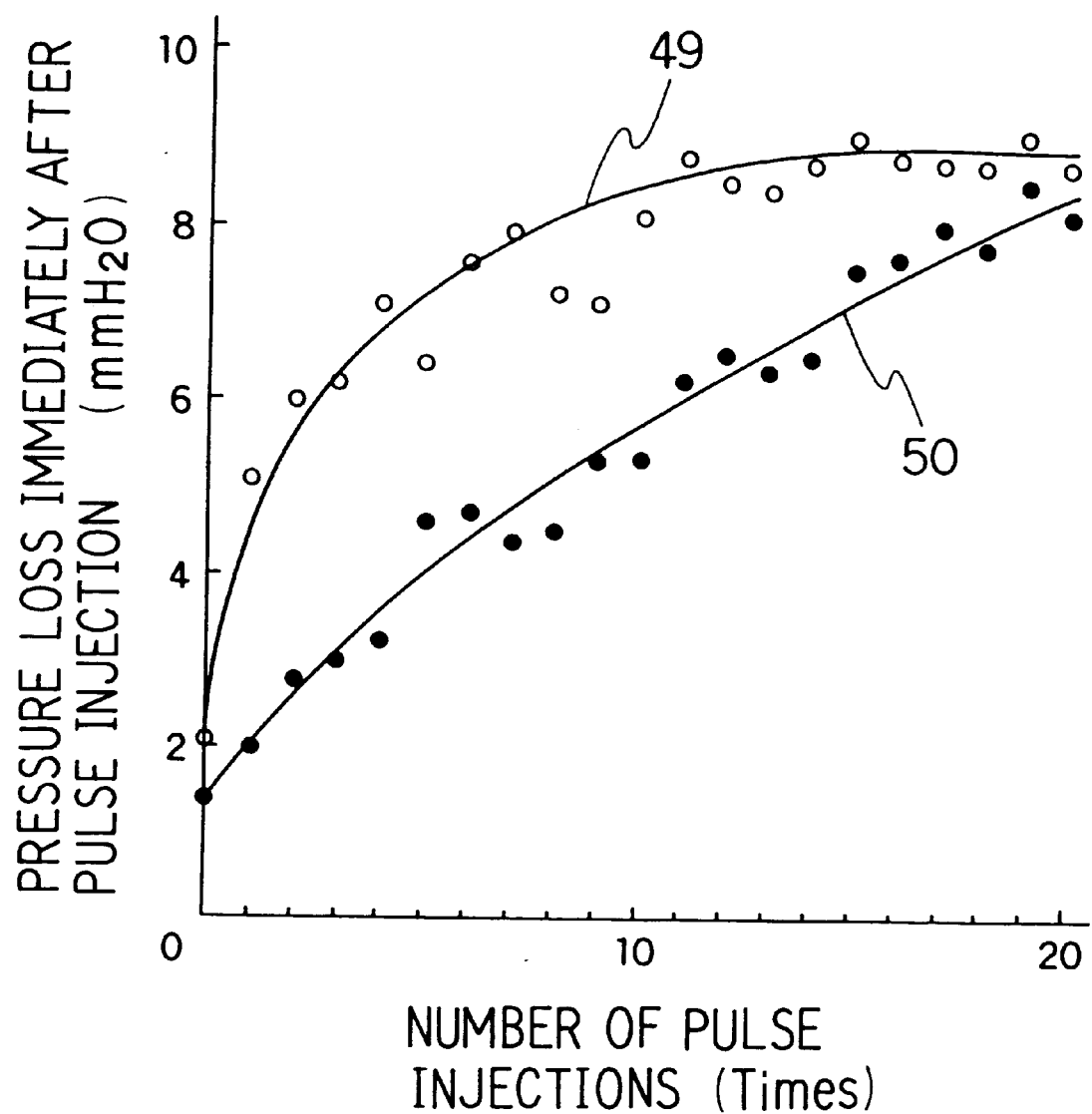
FIG. 10 is a graph showing pressure loss of filter clothes for dust collection which are produced from each felt of Example 1 and Comparative Example 2.

Dusts: Fly ash $d_{p50}$ 1.7 μm
Filtrating air velocity: 3.3 cm/sec
Fly ash concentration: 20 g/m³
Filtrating area: 30 cm×30 cm Then every time when dusts 46 are accumulated and a differential pressure before and after the test filter (filter cloth) 33 reaches 170 mmH₂O, particles of the accumulated dusts are shaken down by pulse air injection (at a pressure of 3 kg/cm² for 0.1 second). Instantly after the shaking down, the differential pressure (pressure loss) before and after the filter cloth decreases. The differential pressure immediately after the shaking down usually increases as compared with the initial shaking down. The tendency of increase is shown in FIG. 10. In a graph of FIG. 10, numeral 49 represents a pressure loss when using a filter cloth produced from the multilayered felt obtained in Example 1 and numeral 50 is a pressure loss when using a filter cloth produced from the felt obtained in Comparative Example 2. As a result, the pressure loss when using the filter cloth of Example 1 becomes constant after about ten times of pulse injections. As compared with that, with respect to the case of using the filter cloth of Comparative Example 2, the pressure loss after pulse injection continues increasing and in about 20 times of pulse injections, reaches the same level of pressure loss as that of the case of the filter cloth of Example 1. It is explicit from a cross-sectional view of the filter cloth

TABLE 1

| | Structure of felt | Base felt | | Layer of web comprising PTFE staple fibers | | Thickness (mm) | Air permeability (cc/cm²/sec) | Pressure loss (mm H₂O) |
|---|---|---|---|---|---|---|---|---|
| | | Weight (g/m²) | Number of needles (per cm²) | Weight (g/m²) | Intermingling method | | | |
| Ex. 1 | Multilayered felt | 610 | 750 | 100 | Water jet needling | 1.62 | 12.5 | 2.1 |
| Com. Ex. 1 | Single layer felt | 610 | 750 | — | — | 1.78 | 34.3 | 0.8 |
| Com. Ex. 2 | Single layer felt | 710 | 750 | — | — | 1.91 | 26.2 | 1.4 |

As it is clear from the results of Table 1, increase in pressure loss of the multilayered felt of the present invention (Example 1) is within the allowable range.

Evaluation of Performance of Felt as Filter Cloth for Dust Collection

Figure 9:
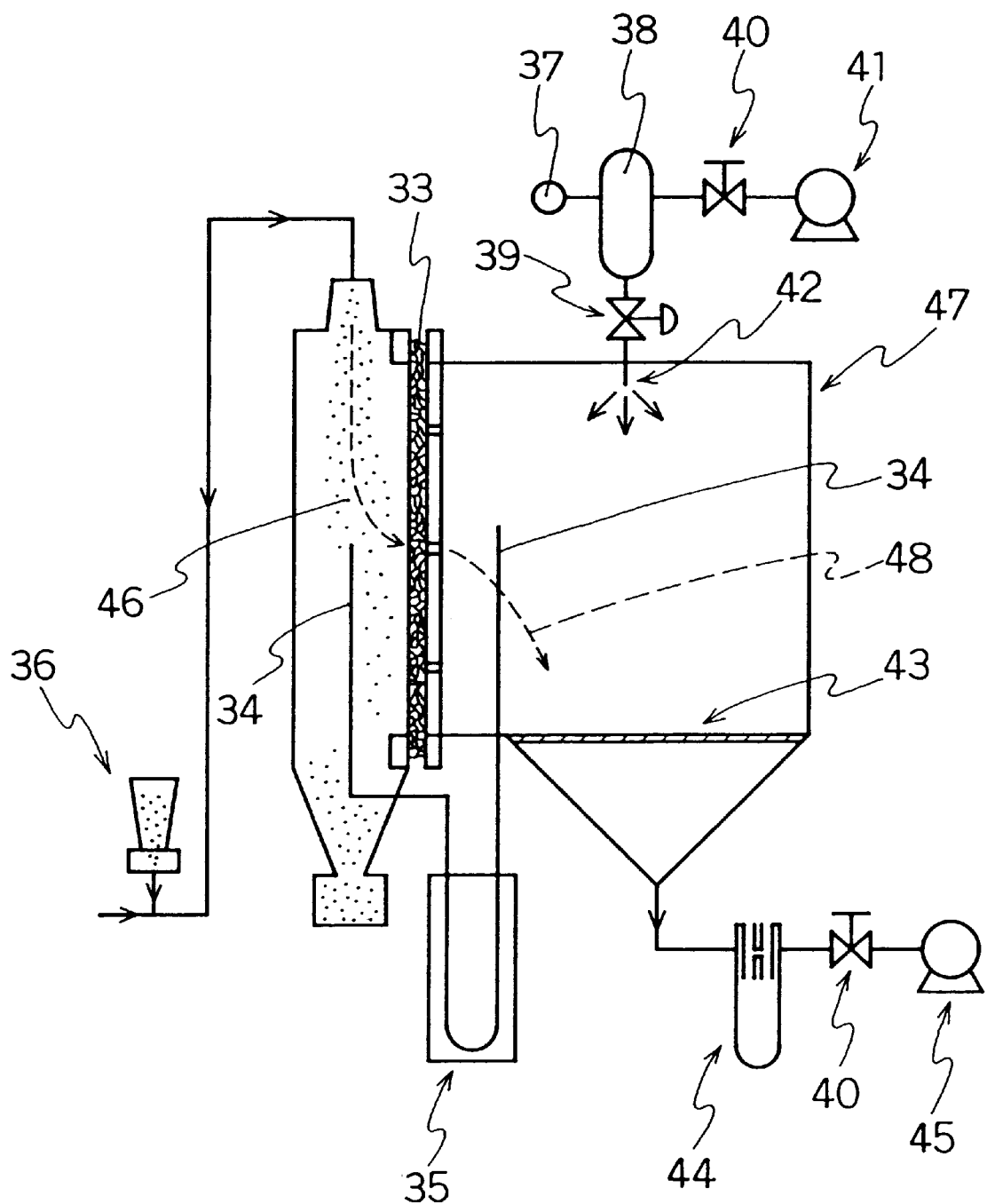
FIG. 9 is an explanatory cross-sectional view of an equipment for evaluating performance of a filter cloth for dust collection.

(12) Performance of each felt as a filter cloth for dust collection which was obtained in Example 1 and Comparative Example 2 was evaluated by using an equipment shown in FIG. 9.

In FIG. 9, numeral 33 represents a test filter (measuring area: 30 cm×30 cm) produced from a multilayered felt or a single layer felt, numeral 34 represents a nozzle for measuring pressure loss, numeral 35 represents a manometer, numeral 36 represents a dust feeder, numeral 37 represents as shown in FIG. 11 that increase in pressure loss is caused by the entering particles of dusts into the filter cloth.

FIG. 11(a) is an explanatory cross-sectional view for explaining a state of a filter cloth of Comparative Example 2 before dust collection. In FIG. 11(a), numeral 51 represents a base fabric, numeral 52 represents a fiber portion of a base felt and numeral 53 represents the base felt. FIG. 11(b) is an explanatory cross-sectional view for explaining a state of the filter cloth after dust collection. In FIG. 11(b), numerals 51, 52 and 53 are the same as above. Numeral 54 represents particles of dusts and numeral 55 represents particles of dusts passing through the filter cloth.

As shown in FIG. 1(b), it is seen that the filter cloth of Example 1 catches particles of dusts in a dense layer of its surface.

Thereby it is indicated that in case of the filter cloth of Example 1 having a dense layer on its surface, even if an initial pressure loss is somewhat high, the pressure loss does not increase during use unlike Comparative Example 2.

Further in Comparative Example 2, as shown in FIG. 11(b), it was observed that during the tests, particles of dusts passed through the filter cloth and leaked therefrom and that the surface of the filter cloth at the opposite side of the dust-collecting surface was stained and colored. On the other hand, in case of the filter cloth of Example 1, as shown in FIG. 1(b), stain at the opposite side of the filter cloth was not observed.

EXAMPLE 2

Joining of Base Felt of Fibers Other Than PTFE Staple Fibers and Web of PTFE Staple Fibers Process for Joining into Multilayer (1) As the base felt, there were used commercially available filter clothes for bag filter such as (a) filter material C09000 (trade name) comprising a meta-linked aramid fiber and being available from Teijin, Ltd. (this material has a dust-collecting surface subjected to singeing) and (b) filter material P84 (trade name) comprising a polyimide fiber and being available from Lenzing Co., Ltd. (this material has a dust-collecting surface subjected to singeing).

Joining of a web of PTFE staple fibers and the above-mentioned two kinds of base felts was carried out on the surface opposite to the dust-collecting surface of the base felt by the methods of (8), (9), (10) and (11) of Example 1, thus producing a multilayered felt (c) with above (a) and a multilayered felt (d) with above (b).

Further (c) was nipped (nip pressure: 5 kg/cm, peripheral speed: 2 m/min) from above with a silicone rubber roll by bringing the PTFE surface into contact to a metal roll surface heated to 200° C. to make the surface of PTFE layer smooth, and thus a multilayered felt (e) having a smoothed PTFE surface was produced. Also a multilayered felt (f) having a smoothed PTFE surface was produced from the multilayered felt (d). Weight, thickness and air permeability of above (a) to (f) were measured in the same manner as in Example 1, and shown in Table 2. A weight of PTFE was 100 g/m².

With respect to above (c) to (f), peel test was carried out by using an adhesive tape VINYCLOTH (trade name) available from Sekisui Kagaku Kabushiki Kaisha to check to see occurrence of interface adhesion failure between the layer of PTFE staple fibers and the base felt. There occurred no peeling between them.

Though removal of fibers was observed on the surface of the adhesive tape slightly, its amount was less than 5% (based on filter material) per one application of the tape through weight method.

With respect to a commercially available filter material produced by laminating an expanded porous membrane to a glass cloth, when the same peel test as above was conducted, interface adhesion failure occurred easily. (Performance test of filter cloth for dust collection) (2) Performance test of above (a) to (f) as the filter cloth for dust collection was carried out under the same conditions as in above (12).

The dust-collecting surfaces of (a) and (b) were surfaces not subjected to singeing, and the dust-collecting surfaces of (c), (d), (e) and (f) were PTFE layer surface.

The dust collection and shaking down by pulse injection were repeated 20 times, and the results thereof are shown in Table 2.

TABLE 2

| | | Weight (g/m²) | Thickness (mm) | Air permeability (cc/cm²/sec) | Pressure loss[1] (mm H₂O) Initial pulse injection | Pressure loss[1] (mm H₂O) Immediately after 20th pulse injection | Friction[2] coefficient |
|---|---|---|---|---|---|---|---|
| Kind of felt in Ex. 2 | a | 450 | 2.0 | 26 | 3.2 | 12 | 0.26 |
| | b | 500 | 2.4 | 20 | 4.1 | 14 | 0.29 |
| | c | 550 | 2.2 | 17 | 5.1 | 10 | 0.20 |
| | d | 600 | 2.6 | 12 | 6.0 | 11 | 0.20 |
| | e | 550 | 2.0 | 10 | 9.2 | 13 | 0.18 |
| | f | 600 | 2.4 | 8 | 10.7 | 15 | 0.18 |
| Kind of felt in Ex. 3 | i | 550 | 2.2 | 17 | 5.2 | 10 | 0.20 |
| | j | 550 | 2.0 | 10 | 9.3 | 13 | 0.18 |

[1]Air velocity when measuring a pressure loss is 3.3 cm/sec.
[2]FEM-4S (available from Toyo Sokki Kabushiki Kaisha) was used as a friction coefficient measuring equipment. Namely a force f for pulling a steel ball having a weight (w) of 200 g at a speed of 0.27 cm/sec is measured, and a friction coefficient $\mu$ is calculated by an equation of $\mu = f/w$.

As it is clear from the results of Table 2, ratios of increase in pressure loss immediately after the pulse injection of (c), (d), (e) and (f) were smaller than those of (a) and (b).

As a result of the observation, the reason of difference in change of the ratio of increase is that like above (12), in (a) and (b), dusts were entering from the surface deeply into the base fabric and that in (c), (d), (e) and (f), dusts were caught by a layer comprising PTFE staple fibers and hardly entered into the base felt.

Performance Test as a Sliding Member (3) Friction coefficients of the surfaces of (a) and (b) in (1) of Example 2 which had not been subjected to singeing and the surfaces of layers of the multilayered felts (c), (d), (e) and (f) which comprised PTFE staple fibers were measured by the method mentioned below Table 2. The results are shown in Table 2.

As it is clear from the results of (c), (d), (e) and (f) of Table 2, friction coefficients thereof could be decreased largely as compared with those of (a) and (b).

Further the surface of above (c) was smoothed by COM-FIT (trade name) available from Uenoyama Kiko Kabushiki Kaisha (peripheral speed of roll: 1 m/min, temperature: 140° C. ) to give a multilayered felt (g). As a result, the friction coefficient of the surface of a layer of PTFE staple fibers could be decreased up to 0.15.

Further the multilayered felt (d) was subjected to smoothing by pressing by hand a metal plate heated to 360° C. to the surface of a layer of PTFE staple fibers of the felt (d), and thus a multilayered felt (h) was obtained. The friction coefficient of the PTFE surface could be decreased to 0.13.

Mold Release Property Test (4) With respect to (g) and (h) obtained in (3) of Example 2, peel test was repeated on the surface of a layer of PTFE staple fibers by using an adhesive tape. There was no removal of staple fibers, and there was no transfer of an adhesive onto the surface.

On the other hand, with respect to above (a) and (b), peel test was carried out by using the adhesive tape, and there occurred removal of fibers and raising of fibers.

Water Repellency Test (5) With respect to the both surfaces of commercially available (a) and (b) and the surfaces of web layers of PTFE staple fibers of (c), (d), (e), (f), (g) and (h) of Example 2, water repellency of the surfaces was observed by using a mixed solution of IPA (isopropyl alcohol) and water. The water repellency was evaluated as ○ when the mixed solution was repelled, and as × when the mixed solution infiltrated through the surface. The results are shown in Table 3.

TABLE 3

| | | Mixing ratio of IPA/water in mixed solution (weight ratio) | | | | |
|---|---|---|---|---|---|---|
| | | 50/50 | 40/60 | 30/70 | 20/80 | 0/100 |
| Kind of felt in Ex. 2 | a | X | X | X | X | X |
| | b | X | X | X | X | X |
| | c | X | X | ○ | ○ | ○ |
| | d | X | X | ○ | ○ | ○ |
| | g | X | X | ○ | ○ | ○ |
| | e | X | X | ○ | ○ | ○ |
| | f | X | X | ○ | ○ | ○ |
| | h | X | X | ○ | ○ | ○ |
| Kind of felt in Ex. 3 | i | X | X | ○ | ○ | ○ |
| | j | X | X | ○ | ○ | ○ |

As is clear from the results of Table 3, it is seen that with respect to the multilayered felts (c), (d), (e), (f), (g) and (h) of the present invention obtained in Example 2, the surfaces of the hydrophilic felts had been modified to strong hydrophobic surfaces.

EXAMPLE 3

Figure 12:
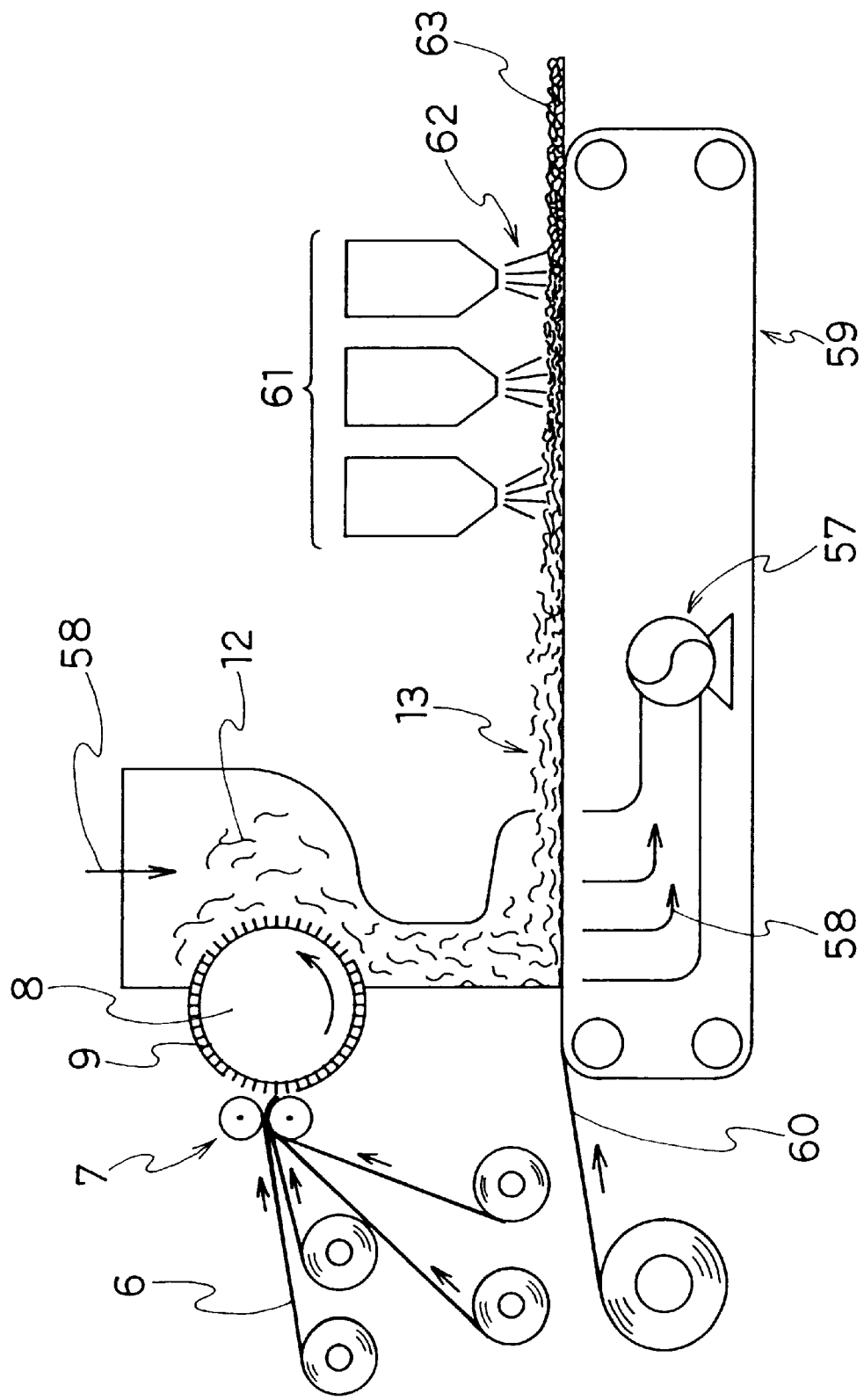
FIG. 12 is an explanatory cross-sectional view of an equipment for tearing and opening a PTFE film, accumulating the film on a base felt and then intermingling fibers.

Tearing and Opening a Uniaxially Stretched PTFE Film With Needle Blade Roll Rotating at High Speed to Give Staple Fibers, at the Same Time, Accumulating the Staple Fibers Directly on Base Felt and Then Intermingling by Water Jet Needling to Prepare a Multilayered Felt Placing of Web (1) FIG. 12 is an explanatory cross-sectional view of an equipment used in Example 3 for tearing and opening a PTFE film, accumulating on a base felt and then intermingling. In FIG. 12, numerals 6 to 9, 12 and 13 are the same as above, numeral 57 represents a blower, numeral 58 represents an air flow, numeral 59 represents a transfer belt, numeral 60 represents a base felt, numeral 61 represents a water jet needling machine, numeral 62 represents a high pressure water flow from the water jet needling machine and numeral 63 represents a multilayered felt.

First the same staple fiber 12 having loop structure and/or branch as the staple fiber shown in FIG. 3 was produced by tearing and opening the uniaxially stretched PTFE film 6 obtained in (8) and (9) of Example 1, with the needle blade roll 8 rotating at high speed in the equipment shown in FIG. 12. At the same time, the obtained staple fibers 12 were accumulated on the base felt 60 conveyed by the transfer belt 59 shown in FIG. 12 so that the web 13 having a weight of 100 g/m² was obtained. In that case, the web 13 was drawn by the blower 57. As the base felt 60, there was used a filter material CO9000 (trade name) of meta-linked aramid fiber available from Teijin, Ltd., which is a commercially available filter cloth for bag filter. An average diameter of the PTFE staple fibers 12 was 21 µm.

The needle blade roll 8 shown in FIG. 12 differs from the needle blade roll used in (4) of Example 1 and has the structure mentioned below.

Namely as shown in FIG. 8(a), the needle blade roll 8 is a metal roll produced by dividing a cylinder of 90 mm outside diameter×250 mm length into 90 parts on its circumference and providing sharp needles 9 at intervals of 8 needles per 1 cm in the longitudinal direction so that the outside diameter of the roll at the end of the needle is 100 mm. The rotational speed of the needle blade roll 8 was 3,000 rpm and the film feeding speed was 2 m/min.

Process for Joining Into Multilayer (2) Next the base felt 60 produced in (1) of Example 3, on which the PTFE staple fibers 12 were placed, was subjected to water jet needling with the water jet needling machine 61 (available from Perfojet Co., Ltd. (France)) shown in FIG. 12 to intermingle the staple fibers forming the web 13 and the fibers forming the base felt 60. Thus a multilayered felt 63 (hereinafter referred to as "(i)") of a two-layered structure comprising the base felt layer and the PTFE staple fiber layer was produced.

Conditions for Water Jet Needling

The nozzles of the water jet needle were so arranged that 800 nozzles having 100 µm diameter were set at intervals of 0.6 mm in the transverse direction and at three rows in the longitudinal direction. The injection pressure was 80 kg/cm², 120 kg/cm² and 170 kg/cm² at the first, second and third rows, respectively.

Further while bringing the PTFE surface of above (i) into contact with a metal roll surface heated to 200° C., (i) was nipped from above with silicone rubber rolls (nip pressure: 5 kg/cm, peripheral speed: 2 m/min) to smooth the PTFE surface. Thus a multilayered felt (j) was produced.

Weight, thickness and air permeability of above (i) and (j) were measured in the same manner as in Examples 1 and 2. The results are shown in Table 2.

With respect to above (i) and (j), peel test was carried out by using an adhesive tape VINYCLOTH available from Sekisui Kagaku Kabushiki Kaisha to check to see occurrence of interface adhesion failure between the layer of PTFE staple fibers and the base felt. There occurred no peeling between them.

Though removal of fibers was observed on the surface of the adhesive tape slightly, its amount was less than 5% (based on filter material) per one application of the tape through weight method.

With respect to a commercially available filter material produced by laminating an expanded porous membrane to a glass cloth, when the same peel test as above was conducted, interface adhesion failure occurred easily. (Performance test of filter cloth for dust collection) (3) Evaluation of performance of above (i) and (j) as a filter cloth for dust collection was carried out under the same conditions and in the same manner as in Examples 1 and 2. A dust-collecting surface was a PTFE surface. The results of repeating dust collection and shaking down of dusts by pulse injection by 20 times are shown in Table 2. As it is clear from the results of Table 2, in (i) and (j), a ratio of increase in pressure loss immediately after the pulse injection was smaller as compared with above (a) and (b).

As a result of the observation, the reason of a difference in change of the ratio of increase was that like Examples 1 and 2, in (a) and (b), dusts were entering from the surface deeply into the base fabric and that in (i) and (j), dusts were caught by a layer comprising PTFE staple fibers and hardly entered into the base felt.

Performance Test as a Sliding Member (4) Friction coefficients of the PTFE surfaces of (i) and (j) were measured. The results are shown in Table 2.

As it is clear from the results of Table 2, friction coefficients of (i) and (j) could be decreased largely like above (c) and (e) as compared with those of (a) and (b).

Water Repellency Test (5) With respect to the PTFE surfaces of (i) and (j) of Example 3, water repellency of the surfaces was observed by using a mixed solution of IPA (isopropyl alcohol) and water. The water repellency was evaluated as ○ when the mixed solution was repelled, and as × when the mixed solution infiltrated through the surface. The results are shown in Table 3.

From Table 3, it is seen that with respect to (i) and (j) obtained in Example 3, the surfaces of the hydrophilic felts had been modified to strong hydrophobic surfaces.

EXAMPLE 4

(1) Placing of a web was carried out in the same manner as in (1) of Example 3 except that a weight of the web of PTFE staple fibers placed on a base felt which was a filter material C09000 (trade name) of meta-linked aramid fiber being commercially available from Teijin, Ltd. as a filter cloth for bag filter was changed to 50 g/m$^2$.

(2) With respect to the base felt produced in (1) of Example 4, on which the web was placed, the layer of PTFE staple fibers thereof was wetted (hereinafter referred to as "pre-wet") with IPA and water jet needling was carried out with the water jet needling machine (available from Perfojet Co., Ltd. (France)) shown in FIG. 12 to intermingle the staple fibers forming the web and the fibers forming the base felt. Thus a multilayered felt (k) of a two-layered structure comprising the base felt layer and the PTFE staple fiber layer was produced.

Conditions for Water Jet Needling

The nozzles of water jet needle were so arranged that 800 nozzles having 100 μm diameter were set at intervals of 0.6 mm in the transverse direction and at three rows in the longitudinal direction. The pressure was 40 kg/cm$^2$, 80 kg/cm$^2$ and 130 kg/cm$^2$ at the first, second and third rows, respectively.

The pre-wetting is usually carried out with water. However since PTFE is hydrophobic and is not get wet with water, IPA was used to reduce a surface tension. Any other one which decreases a surface tension may be used.

In the obtained multilayered felt (k), the PTFE staple fibers accumulated on the base felt could be intermingled with the fibers of the base felt without damaging appearance of the web obtained in (1) of Example 4, that is, with the mixing of fibers of the web being as it was.

COMPARATIVE EXAMPLE 3

(1) After the felt obtained by placing a web on the base felt which was produced in (1) of Example 3 was subjected to pre-wetting with water, water jet needling was carried out with the water jet needling machine (available from Perfojet Co., Ltd. (France)) shown in FIG. 12 to intermingle the staple fibers forming the web and the fibers forming the base felt. Thus a multilayered felt (m) of a two-layered structure comprising the base felt layer and the PTFE staple fiber layer was produced. (Conditions for water jet needling).

The water jet needling was carried out in the same manner as in Example 3.

In the obtained multilayered felt (m), mixing of fibers of the web obtained in (1) of Comparative Example 3 by accumulating the PTFE staple fibers on the base felt was remarkably damaged. In other words, intermingling with the base felt could not be done with the web being as it was. The PTFE staple fibers of the web were scattered by water pressure of water jet needling.

INDUSTRIAL APPLICABILITY

The filter cloth for dust collection of the present invention assures small pressure loss and easy shaking down of dust particles, and is excellent in friction property and mechanical strength.

Also the sliding member of the present invention is excellent in sliding property.

Also the water repellent member of the present invention is excellent in water repellency.

Also the non-sticking member of the present invention is excellent in non-sticking property.

Also the member for supplying mold releasing agent in electrophotographic apparatuses is excellent in air permeability, heat resistance and oil resistance.

Further the present invention can provide the multilayered felt which can be used for these members and the process for producing the multilayered felt.

What is claimed is:

1. A multilayered felt obtained by forming a layer of a web comprising polytetrafluoroethylene staple fibers on at least one surface of a felt and joining the polytetrafluoroethylene staple fibers and fibers which form the felt by intermingling, wherein the polytetrafluoroethylene staple fibers have a branch and/or a loop.

2. The multilayered felt of claim 1, wherein a length of the polytetrafluoroethylene staple fiber is from 3 to 25 mm.

3. The multilayered felt of any of claims 1, wherein the polytetrafluoroethylene comprises a semi-sintered polytetrafluoroethylene.

4. The multilayered felt of any of claims 1, wherein a weight of the web comprising the polytetrafluoroethylene staple fibers is from 50 to 500 g/m$^2$.

5. A filter cloth for dust collection comprising a multilayerd felt obtained by forming a layer of a web comprising polyterafluoroethylene staple fibers on at least one surface of a felt and joining the polytetrafluoroethylene stable fibers and fibers which form the felt by intermingling.

6. The filter cloth for dust collection of claim 5, wherein the fibers which form the felt are at least one selected from the group consisting of polyester fibers, meta-linked aramid fibers, para-linked aramid fibers, polyphenylene sulfide fibers, polyimide fibers, phenol resin fibers, fluorine-containing resin fibers, carbon fibers or glass fibers.

7. A process for producing a multilayered felt by placing a web of polytetrafluoroethylene staple fibers having a branch and/or a loop, on at least one surface of a felt and then joining the polytetrafluoroethylene staple fibers and the fibers which form the felt by intermingling through water jet needling and/or needle punching.

8. The process for producing a multilayered felt of claim 7, wherein the polytetrafluoroethylene staple fibers are obtained by tearing and opening a uniaxially stretched polytetrafluoroethylene film with a needle blade roll rotating at high speed and immediately after the opening, the polytetrafluoroethylene staple fibers are accumulated on the felt to be joined to form the web.

9. The process for producing a multilayered felt of claim 7, wherein the polytetrafluoroethylene staple fibers which form the web are previously subjected to hydrophilization and immediately after the opening, the polytetrafluoroethylene staple fibers are accumulated on the felt to be joined to form the web.

10. The process for producing a multilayered felt of claim 7, wherein the web is joined to the felt after being subjected to hydrophilization.

11. The process for producing a multilayered felt of claim 10, wherein the web is subjected to hydrophilization with a hydrophilic liquid having a surface tension of not more than 30 dyne/cm.

12. The process for producing a multilayered felt of claim 7, wherein the polytetrafluoroethylene comprises a semi-sintered polytetrafluoroethylene.

* * * * *